United States Patent [19]

Pish

[11] Patent Number: 5,709,520

[45] Date of Patent: Jan. 20, 1998

[54] PORTABLE WHEEL DOLLY

[76] Inventor: Paul J. Pish, 1115 Morse Ave., Schaumburg, Ill. 60193

[21] Appl. No.: 592,792

[22] Filed: Jan. 26, 1996

[51] Int. Cl.$^6$ ..................................................... B66F 3/08
[52] U.S. Cl. .................... 414/427; 414/428; 254/7 B; 280/79.4
[58] Field of Search .................. 414/426, 427, 414/428, 429, 430, 563; 254/7 R, 7 B, 3 R, 3 B, 9 R, 9 B, DIG. 10, 48, 101, 133 R; 280/79.4

[56] References Cited

U.S. PATENT DOCUMENTS

| | | | |
|---|---|---|---|
| 1,343,650 | 6/1920 | Snyder | 414/427 |
| 1,361,889 | 12/1920 | Miller et al. | 414/428 |
| 2,252,534 | 8/1941 | Trotter | 414/428 |
| 2,349,251 | 5/1944 | Domoj | 280/79.4 X |
| 5,096,161 | 3/1992 | Tomasevic | 254/7 B X |

FOREIGN PATENT DOCUMENTS 45670  6/1966  German Dem. Rep. ............ 280/79.4

*Primary Examiner*—Frank E. Werner
*Attorney, Agent, or Firm*—Lester N. Arnold

[57] ABSTRACT

Improved wheel-lift apparatus comprising wheel dolly or caddy devices useful to provide mobility, lift and support for aircraft wheel assemblies for facilitating aircraft maneuverability in hanger or storage areas, comprised of generally U-shaped adjustable frame support devices having an adjustable cross member and a pair of parallel spaced extended end frame members defining an opening therebetween within which to laterally receive an aircraft wheel assembly, a pair of lift plate devices oppositely-disposed and supported by the extended frame members, respectively, at least one of the lift plate devices being pivotally movable to engage the wheel assembly to provide lift thereof, pivotal cam devices connected to the movable lift plate devices and providing upward and downward pivotal movement thereto, threaded rotatable gear devices having an elongated length dimension and engaging the pivotal cam devices on a distal free end thereof, said gear devices being movable along its length dimension to provide pivotal movement of the cam devices, and pivotal trunnion devices being pivotally supported by the frame support devices and having threaded aperture devices through which to receive correspondingly threaded gear devices for providing pivotal movement of the gear devices during rotational movement along the length dimension thereof for enabling the gear devices to track the pivotal movement of the cam devices.

11 Claims, 4 Drawing Sheets

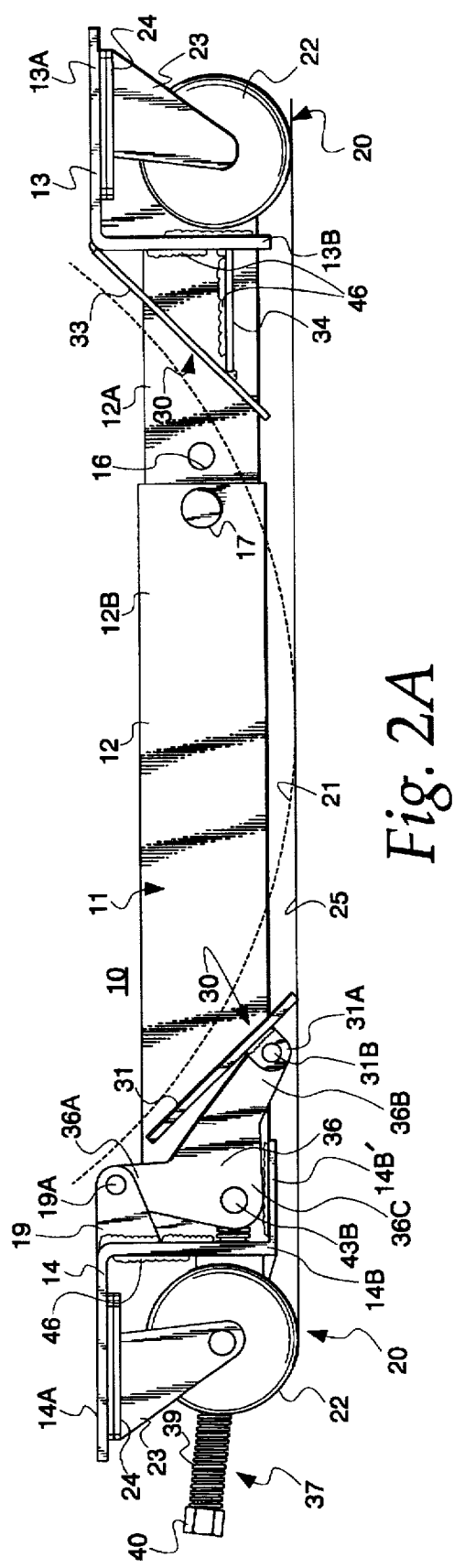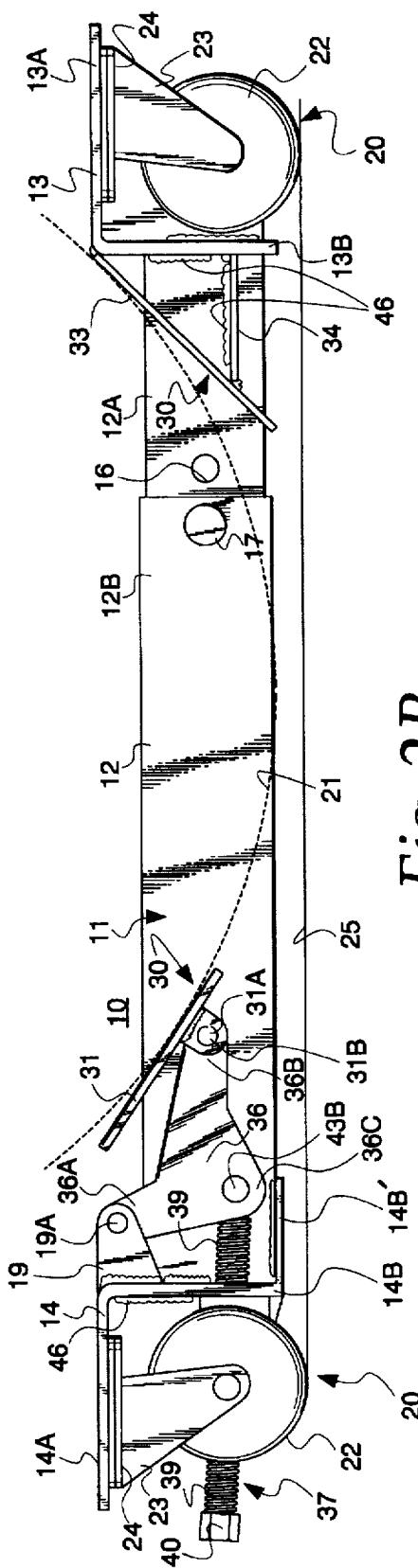

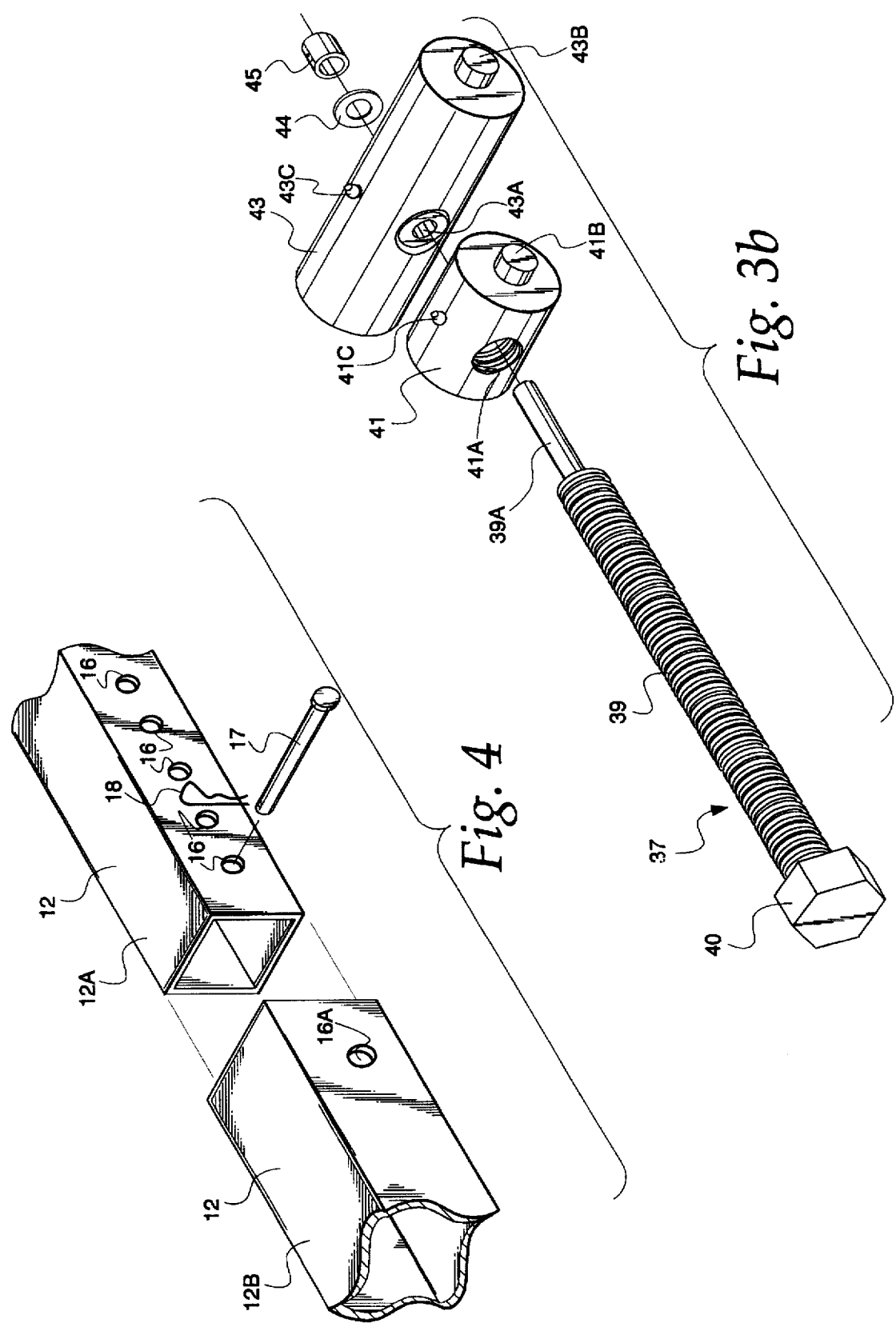

PORTABLE WHEEL DOLLY

FIELD OF THE INVENTION

The present invention relates to portable wheel dollies for use with light weight wheel assemblies such as light aircraft, and more particularly, to a portable wheel dolly unit with improved adjustable frame support means defining a central opening in which to receive a selected wheel assembly, improved lift means movable to engage and lift said wheel assembly by movable lift plate means, pivotal cam means connected to the lift plate means, threaded rotatable gear means of elongated length dimension connected to the cam means to provide movement thereof, and pivotal trunnion means receiving the rotatable gear means and providing pivotal movement thereof.

BACKGROUND OF THE INVENTION

A variety of wheel dollies or caddies are known to exist and are described in the prior art relative to the pertinent field of invention. There are fixed dollies having no adjustment thereof with which to accommodate varying sizes of wheel assemblies, and prior art dollies without lifting mechanisms with which to provide lifting elevation for the associated wheel assembly. Most dollies are supported in some manner so as to be movable with respect to ground or floor once the wheel assembly is placed on or carried by the dolly mechanism, and one such common means of support is provided by sets of wheel casters mounted to the frame of the dolly unit. Prior art portable wheel dollies vary from heavy-duty rigid frame type dollies for use with rail mounted wheel assemblies to dollies for application with large truck or dual mounted wheel assemblies. There are dollies which provide limited adjustment of frame members to be adjusted to desired closure upon an elevated wheel assembly to then permit the wheel assembly to supported in the elevated position thereof. Generally, a large variety of heavy-duty dollies do not provide for inclusion of lifting mechanisms for providing lifting action to elevate an associated wheel assembly, in which case, external lifting mechanisms must be provided.

Wheel dolly assemblies that are more pertinent to the field of this invention, are provided with wheel casters to enhance mobility, adjustable frames to enable frame opening adjustment to fit different wheel diameters, and wheel interacting lifting mechanisms for lifting (elevating) a selected wheel assembly. One such relevant prior art dolly is described and set forth in U.S. Pat. No. 3,583,723 to utilize a portable main frame member (12) having wheels (22 and 24) and a treadplate (50) upon which the associated wheel assembly would be supported when the treadplates are moved to and locked in an elevated position. This device (10) does not provide for adjustment of the frame member for different diameter wheel assemblies, and the treadplates must first be manually raised to their elevated position before the associated wheel is to be placed on the elevated support plates. Another related field prior art dolly is set forth in U.S. Pat. No. 4,976,449, most useful with dual mounted truck tires, in which two separate bar like frame members (14 and 16) are placed in parallel alignment in front and rear of the associated set of dual tires, and provided with a threaded shaft (12) centrally intersecting both frame members, active when rotated to pull the rear placed frame member toward the front placed frame member to support the tire when in a raised position. It is believed that this prior dolly is not useful to provide lifting of the tire, but the tire is first lifted to elevated position by outside lifting means and the closure adjustment of the frame members (14 and 16) is then accomplished utilizing the rotatable shaft (12). Still another related field prior art dolly, shown and described in U.S. Pat. No. 4,692,082, has an adjustable frame wherein a generally U-shaped frame support member has the cross or base member (16) provisioned with rack member (26) to cause movement of a movable extended leg (14) toward a fixed extended leg (12) through manual turning of a crank handle (28). It is unclear that the dolly would be suitable to cause lifting of the associated wheel (70) through the manual cranking of the handle to move the leg (14) toward the fixed leg (12) without the wheel (70) being first lifted by external lifting means to the desired elevated position. A prior art dolly which employs a lift mechanism is described in U.S. Pat. No. 4,596,506, wherein a pair of movable chocks (14 and 15) are moved by the action of an energizable air bladder (17). Another prior art dolly which employed lifting means for lifting reel carriers is set forth and described in U.S. Pat. No. 2,452,481, wherein hydraulic jacks (17) pivotally connected to triangular actuating levers (22) are effective to cause the actuating lever to raise the associated reel carrier. Thus, it is clearly seen that prior art improvements to such portable wheel dollies have been numerous, but a prior art device is not known by the inventor of this invention that provides the combination of desirable elements for wheel dollies to provide the ready adjustment of frame members in a simple manner to quickly provide for different diameter wheels, and to provide for inclusion of lift means effective to lift a captured wheel assembly to its elevated position, when utilizing the combination of improved pivotal cam means, connecting gear means and pivotal trunnion means set forth and described in this invention.

The aforementioned prior art portable wheel dollies are principally shown in applications with reel carriers, rail wheels, trucks or automobiles, and in particular, for use with an associated single wheel assembly when already elevated by separate jack means to then support the elevated wheel during performance of work tasks, such as repair or replacement of brakes, seals, axles and the like. Some prior art wheel dollies are not intended or disclosed to facilitate movement of the vehicles when the wheel assemblies are being supported entirely by multiple wheel caddies, although this is a primary object of the present invention to provide maneuverability of light aircraft when the wheel assemblies are each supported in an elevated position by a wheel dolly of the present invention. Another object is to provide for the inclusion of lift means effective to lift the associated light aircraft to the desired elevated position. It is desired to provide an improved wheel dolly having adjustable frame member to provide adjustment to different diameter sizes of wheel assemblies. The wheel dolly of the present invention is of a type to be portable through provision of light weight yet durable high-strength frame members supported on roller wheel assemblies, flat-like appearance with generally U-shaped frame members defining a central opening into which to receive an associated wheel assembly of a light aircraft desired to be moved. The wheel dolly of the present invention includes flatlike lift plate means actuated by movable actuator levers of the bell-crank type comprising cam means, which levers are simultaneously moved by the rotating axial movement of a connecting threaded gear of the worm gear type comprising gear means. The lifting mechanism of the present invention is effective to lift the associated wheel assembly to the desired elevated position without the use of external jacking devices.

Therefore, in accordance with the embodiment of the present invention, and in order to facilitate maneuverability of light aircraft within tight or limited storage or hanger areas, it becomes advantageous to provide an improved wheel dolly on which to mount the fixed axes wheel assemblies of the aircraft, the improved wheel dolly being readily portable through roller caster mountings on the frame support, providing adequate strength configuration of its component frame members through use of a U-shaped frame channel, providing lateral adjustment of the frame channel in order to accommodate wheel assemblies of different diameters, and incorporating lift means to lift the aircraft wheel assembly to its raised position as an integral part of the aircraft wheel dolly. It is anticipated that one such wheel dolly will be employed to lift and support each fixed non-pivotally mounted wheel assembly of an aircraft.

SUMMARY OF THE INVENTION

The improved wheel dolly of the present invention includes wheel-mounted frame support means comprised of angular frame members configured to define a generally U-shaped frame support having a base or bight cross frame member and a pair of parallel extending oppositely disposed end frame members extending from the opposite end portions of the base cross member to define a central opening therebetween within which to receive the width of a fixed axial wheel assembly of an aircraft or other vehicle. The base frame member is made to be adjustable along its length dimension by providing one portion thereof to be telescopically received within the other portion thereof, and employing pin means inserted through selected ones of aligned openings to capture the chosen telescopic insertion of the two separable portions of the base frame member whereby the longitudinal length of the frame support may be varied for different diameter wheel assemblies. Lift means is comprised in combination of a pair of oppositely disposed lift plate members supported by the frame support means, at least one lift plate member being movable into the direction of the central opening, and in the preferred embodiment of the present invention, one of the lift plate members is movable by cam means to engage an associated wheel assembly desired to be elevated, while the other lift plate member is fixedly mounted to the opposite end frame member, pivotal cam means comprised of a pair of actuator levers configured to be generally triangular shaped of the bell-crank variety and being pivotally connected to the frame member at their apex corner portions and being pivotally connected to the movable lift plate at their lowermost corner portions which are mounted to extend toward the central opening, and gear means comprised of a threaded rotatable worm gear member extendable through threaded pivotal trunnion means fixed relative to the end frame member through which the worm gear member is threadedly received, the worm gear member extending on its inner end portion thereof to connect to the third and centrally disposed corner portions of the triangular actuator levers. The worm gear means is threaded along its lengthwise axis and extends along the generally central portion of its length dimension through the threaded pivotally mounted trunnion means which is fixedly mounted to the frame member. The innermost end extremity of the worm gear means is connected to the actuator levers, as stated above, and linear rotational movement of the gear means provides a corresponding component of linear movement to the actuator levers of the cam means, and pivotal movement of the gear means is enabled by the pivotal trunnion means, which gear movements are imparted to the pivotally connected actuator levers of the cam means and to the connected lift plate member. The opposite and free end of the rotatable gear member extends exteriorly of the frame support means and is engageable for causing rotational movement thereof, a nut like configuration being provided on said free end portion thereof whereby a powered driven torque wrench can be engaged to rotate the worm gear member.

In summary, bell-crank type cam means is pivotally mounted to frame support means and actuates lift plate means to engage an adjacently positioned wheel assembly for providing lifting of the wheel assembly when correspondingly actuated by threaded rotatable worm gear means moving through correspondingly pivotally mounted threaded trunnion means fixed to the frame support.

It is an object of the present invention to provide an improved wheel dolly having an adjustable frame support to accommodate wheel assemblies of different diameters.

It is an object of the invention to provide an improved wheel dolly that is portable by means of being mounted on swivel type roller casters, and provides support of the associated wheel assembly in an elevated position whereby the vehicle employing the wheel assembly can be moved about while mounted on the wheel dolly.

It is another object of the present invention to provide an improved wheel dolly that employs lift means to raise an engaged wheel assembly to a raised position and to support the raised wheel assembly in such position.

It is still another object of the present invention to provide lift means comprised of a pair of oppositely disposed lift plates, at least one of which is movable to engage an adjacent wheel assembly whereby the wheel assembly is lifted with the movement of the engaging lift plate.

It is yet another object of the present invention to provide lifting action of the lift means through pivotally mounted bell-crank type cam means driven by linear acting rotatable worm type gear means.

It is a further object of the present invention to provide the movable lift plate to be mounted to the movable free end of the pivotal bell-crank type cam means.

It is still a further object to provide gear means comprised of a threaded worm gear member and correspondingly threaded pivotal trunnion means to comprise in combination linear movement and pivotal movement for the threaded gear means whereby the actuated rotational movement of the threaded worm gear member through the threaded receiving trunnion means causes a linear component of movement of the worm gear member inwardly with respect to the central opening of the frame support means and provides a pivotal component of movement with respect to the frame support corresponding to the pivotal movement of the actuator levers of the cam means to which the worm gear member is connected.

These and other objects will become readily apparent with reference to the drawings and following description of the preferred embodiment wherein:

THE DRAWING

FIG. 2A is a side elevation view of the wheel dolly of FIG. 1 placed into position for lifting of a wheel assembly, the wheel thereof being shown in reference lines in a lowered position, and the actuating lift plate being shown in a correspondingly lowered position;

FIG. 2B is a side elevation view of the wheel dolly of FIG. 1 placed into position for lifting of a wheel assembly, the wheel thereof being shown in reference lines in a raised position, and the actuating lift plate being shown in a correspondingly raised position;

FIG. 3 is sectional side elevation view of the wheel dolly taken generally along the section reference lines of 3—3 of FIG. 1;

FIG. 3A is a partial sectional view of the left side segment of the wheel dolly taken generally along the section reference lines of 3A—3A of FIG. 1;

FIG. 3B is an isolated exploded view of an elongated gear member and trunnion members to be mounted thereon, showing their assembly of parts for use in combined assembly as depicted primarily in FIGS. 3–3A; and FIG. 4 is a partial perspective view of a segment of an adjustable frame member of the frame support shown for the invention in FIG. 1;

DESCRIPTION OF THE PREFERRED EMBODIMENT

Figure 1:
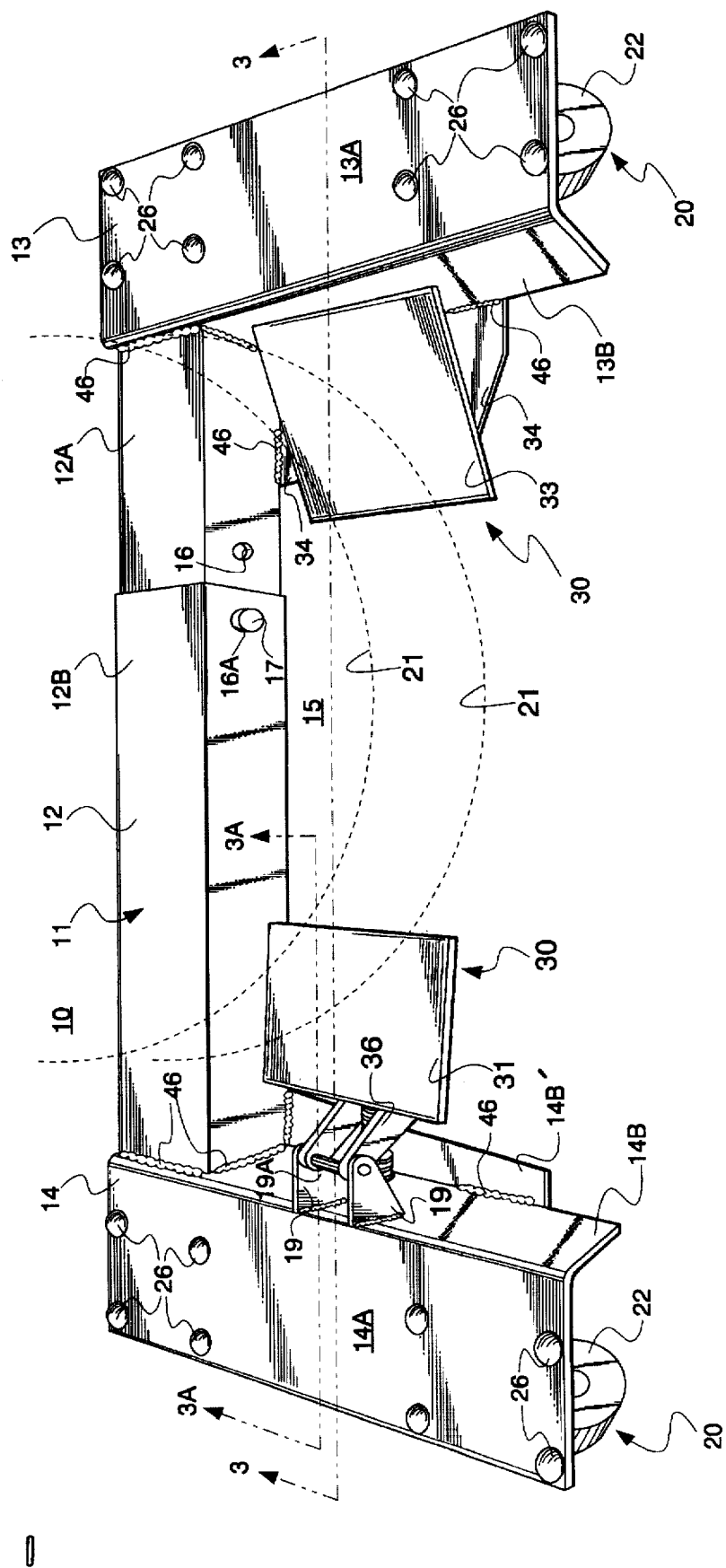
FIG. 1 is a perspective view of the wheel dolly of the present invention shown in its preferred embodiment for application with aircraft wheel assemblies, the wheel thereof being shown in reference lines in both lowered and raised positions for illustrative purposes.

FIG. 1 shows the preferred embodiment of the improved aircraft wheel dolly, also called a caddy, assembly unit 10 of the present invention, and with general reference to the FIGS. 1–4 of the drawings, in accordance with the present invention includes frame support means comprised of a generally U-shaped (three sided rectangular shaped) frame support 11 consisting of a central bight or cross frame member 12 and two parallel spaced outwardly extending end frame support members 13 and 14, defining therebetween a central opening 15 within which to preferably receive a stationary aircraft wheel assembly 21 (shown at 21 in FIG. 1 by dashed discontinued lines representing the circumference of a wheel surface area) so that the end frame members 13 and 14 are positioned to extend perpendicularly across the rear and front faces of the tire of the wheel assembly 21 with the tire positioned to extend laterally of the central opening 15, wherein an end frame member would be positioned adjacently to the surface of the tire. This general orientation between the frame means of the wheel dolly 10 and the wheel assembly 21 is well understood in the pertinent art.

The cross frame member 12 is made or provided to be adjustable (FIG. 4) along its length or longitudinal dimension by providing that a smaller circumferential section 12A will be telescopically received within a slightly larger circumferential section 12B, and providing bolt-slot mechanism or means for securing the members 12A and 12B together by providing multiple apertures or slots 16 extending through the smaller insertable member 12A, to become aligned with an alignable single master slot 16A provided in the section 12B, and when slots 16 and 16A are aligned, a pin or bolt 17 will be received and then captured or held in place by means of a cotter pin 18 (FIG. 4) or by use of similar means or other equivalent means of providing adjustment of the cross frame member 12.

The frame support 11 can be constructed of suitable material such as a metal alloy of composition known in the pertinent art, and the configuration of the frame members is preferably made to provide L-shaped members for the end frame members 13 and 14, whereby adequate strength is obtained, and to provide rectangular-shaped configuration for the cross frame member 12, which provides for a general rectangular configuration that is more convenient for the telescopic reception of members 12A and 12B. Other equally suitable methods or means of providing lengthwise adjustment to the cross member 12 could undoubtedly be employed to enable the frame support 11 to enlarge the frame opening 15 for receiving therein different diameter wheel assemblies. The end frame member 13 includes an upper horizontally flat-like portion 13A and a vertically extending connected side flange portion 13B; and end frame member 14 includes an upper horizontally flat-like portion 14A and a vertically extending connected side flange portion 14B. Additional frame rigidity and strength is obtained along the end frame support 14 by the provision of the strut frame plate 14B' provided to extend perpendicularly from the side frame plate 14B into the opening 15 and is joined such as by welding to the cross frame member 12. Heavy duty swivel type roller caster units 20 are provided at each of the corners of the frame support 11 to provide the mobility of the wheel dolly 10 along the surface of any substrate flooring, represented at 25 in FIGS. 2A, 2B, 3 and 3A of the drawings, on which the wheel assemblies 21 of the targeted vehicle is resting, preferably a wheel assembly of an aircraft such as a light passenger aircraft.

There is shown in FIG. 1 at 21 in dashed reference lines, both a raised and lowered position for a wheel assembly 21 to be lifted and made mobile by the wheel dolly 10 of the present invention. FIG. 2A shows the wheel assembly 21 in a lowered state and FIG. 2B shows the wheel assembly 21 in a raised state. The roller caster units 20 comprise roller means and are disclosed herein to typically include a wheel unit 22 mounted centrally between a pair of tines 23 depending from and attached to an upper pivot plate 24 held in place by bolts 26 to the end frame members 13 and 14, providing the frame support 11 to be movable on the roller means. The roller caster units 20 as described herein are of the swivel type and are of common usage for the intended mobility of the frame support 11 and other equally suitable and equivalent roller means may be employed without departing from the scope and intent of the present invention.

Referring to and as best shown in the drawings in FIGS. 2A, 2B, 3 and 3A, lift means is provided by lift mechanism or assembly 30 comprised of a pair of lift plates 31 and 33, one lift plate 31 be pivotal mounted for movement, and the other lift plate 33 being fixedly mounted to the adjacent frame support member 13. Cam means is provided by pivotal cam mechanism 35, configured to be of the bell-crank triangular configuration, and movable gear means is provided which includes threaded worm gear mechanism 37. The cam mechanism 35 includes a pair of generally triangular shaped cam plate members 36 parallel spaced and being mounted in lateral alignment with respect to each other to work as a single cam unit, each such plate member 36 being of a bell-crank type configuration having a apex or upper pivotal corner area 36A, a forwardly disposed and lowermost free end corner area 36B and a rearwardly disposed actuator corner area 36C as viewed in FIGS. 2A, 2B, 3 and 3A. The cam plates 36 are serving as pivotal acting rocker or actuator means as will be seen from the description of their operation set forth herein. The upper corner areas 36A of the bell-crank cam members 36 are pivotally mounted, respectively, to the frame member 14 by insertable pin 19A received to extend transversely through a pair of ear brackets 19, providing a pivot axis along the length axis for pin 19A. The opposite, free and lowermost end portions 36B of the cam plates 36 are connected to the lift plate 31 through a pair of ear brackets 31A and a transversely extending pin 31B passing through and between the brackets 31A to capture the lift plate 31 to the free end portion of the pair of cam plates 36. It is readily apparent that the lift plate 31 is itself pivotally connected to the cam plates 36 and is pivotal about or around the axis formed between the interaction of the pin 31B extending between the ear brackets 31A.

Hence, it is apparent that the lift plate 31 is connected in a manner to receive initiating pivotal movement from and to pivot in accordance with, in corresponding manner to, the pivotally moving cam plates 36 through providing the above-described pivot axis comprised of brackets 31A and transversely extending pin 31B. Before engaging any adjacently disposed wheel assembly 21, the movement of the lift plate 31 will largely react to the pivotal movement of the connecting cam plates 36 about the pivotal axis provided by the pin 19A in reference to the frame support member 14. Upon contact with the adjacently disposed wheel assembly 21, the lift plate 31 is made capable through its pivotal connection with the cam plates 36 to pivot with respect to the cam plates 36 to permit conformity of contact between the lift plate 31 and the contacted irregular surface or tire tread of the wheel assembly 21. As the lift plate 31 is continued in movement inwardly of the central opening 15 in which the wheel assembly 21 is positioned for being lifted, the lift plate 31 will engage the wheel assembly 21 and lift the wheel assembly 21 to an elevated raised position clear of contact with the floor 25. An extended elevated position of the wheel assembly 21 when another such wheel dolly 10 (not shown in the drawings) as assembled in accordance with the wheel dolly 10 of the present invention and set forth and described herein, is mounted to an oppositely disposed wheel assembly 21 of a vehicle (not shown) desired to be maneuvered, when also set to the elevated position of the associated lift plate (not shown herein), permits the vehicle (not shown) to be moved about through roller action of the movable wheel dolly or caddy device 10 described in this invention.

During the lifting movement of the wheel assembly 21, the oppositely disposed tire surface comes to engage the fixedly mounted lift plate 33 attached to the end frame member 13, which immobile plate 33 prevents further horizontal movement of the wheel assembly 21, permitting only the vertical element of movement imparted by the lifting action of the lift plate 31. In the raised elevated position of the wheel assembly 21, according to the principal of the present invention, the wheel assembly 21 is supported entirely on the pair of lift plates 31 and 33. Now, in providing a downward movement or lowering of the wheel assembly 21, it is at once apparent that as the cam plates are retracted from their inwardly directed movement with respect to the central opening 15, and are actuated to move in an opposite direction outwardly from the central opening 15, the connected lift plate 31 follows to effect the lowering of the raised wheel assembly 21 to permit contact of the wheel assembly 21 with the floor 25.

In order to assure the structural integrity of the parallel mounted cam plates 36 for movement as a single cam plate, the pair of parallel spaced cam plates 36 are desirably linked or connected together to function as a single cam unit to provide pivoting about the upper axis provided by the pin 19A. A preferred manner of interconnecting and strengthening the cam plates 36 is to provide a single cross strut member 36A, as shown only in FIGS. 3 and 3A in cross section by reference character 36A, extending as shown between the interior and oppositely disposed surfaces of the cam plates 36. It is apparent that other equally suitable means could be devised to secure the joinder of the cam plates together for functioning as a single cam unit, which would also provide adequate strength against deformation or torque in lifting a heavy wheel assembly 21 with the connecting lift plate 31. It is further desired for the lift plate 31 to be of adequate strength for its lifting and holding functions as taught hereinabove, and to provide a non-slip or non-skid surface with which to engage the wheel assembly 21. Therefore, the lift plate 31 can be contoured to add strength and provide an improved surface with which to engage the wheel assembly 21, as well as struts may be added to the rear non-contact surface (not shown in the drawings) as desired to add strength and rigidity to the lift plate 31.

In accordance with the preferred embodiment of the present invention, the lift plate 33 is disposed or situated laterally oppositely from and facing the lift plate 31, and constitutes a stationary fixed plate 33 to act as brace means disposed oppositely from the movable lift plate 31. The stationary plate 33 is convenient and functionally to prevent extended horizontal movement of the captured wheel assembly 21 in response to the inwardly directed pivoting movement of the lift plate 31. For desired rigidity, the lift plate 33 is connected to the oppositely disposed end frame member 13 through the use of suitable bracing bracket 34, with the lift plate 33 and the bracket 34 being secured to and along the upper and lower extremities of the wall surface 13B of end frame member 13, respectively. The bracket 34 may be additionally joined to the cross frame member 12. The lift plate 33 comprises brace means against which to arrest appreciable horizontal movement of the captured wheel assembly 21.

The lift plate 33 is ideally oriented to face inwardly of the frame opening 15 and angled over from true vertical direction to assume a selected angle such as 45 degrees or some approximate degree of slant that is not to much more than 60 degrees which may prevent the wheel assembly 21 from moving to a raised position, and not much less than 40 degrees which may tend to permit the wheel assembly to continue to move horizontally rather than upwardly during the lifting action of the pivotal lift plate 31. The surface of the lift plates 31 and 33 can be desirably coated or provided with a non-skid surface or material to aid in preventing the engaged wheel assembly 21 from slipping with respect to the engaging surfaces of the lift plates 31 and 33, respectively, when the lift plate 31 is lifting the wheel assembly 21 through the pivotal movement thereof caused by the movement of the cam plates 36.

The vertical lift action or movement of the wheel assembly 21 is thus effected entirely by the pivotal movement imparted to the movable lift plate 31 which forces the wheel assembly 21 against the fixed plate 33 to thereby be secured against any appreciable horizontal or lateral movement thereof. The principal of the invention would remain the same if the lift plate 31 were to be substituted for the fixedly mounted lift plate 33, thus, lifting the wheel assembly 21 from both sides at the same time, except that the provision of two opposing lift plates 31, both being movable, is a duplicate function for the lift plate 31, and may not be required except in special applications and special embodiments of the present invention where this feature of two opposing lift plates 31 (not shown in the drawing) are deemed necessary. Oppositely, the providing of two fixedly mounted lift plates 33 with the elimination of the movable pivotal lift plate 31 and its interconnecting cam plates 36 to be driven as disclosed in this specification, would delete the very essence of the present invention and would define a structure as shown in the prior related art.

The movement of the cam plates 36 is provided by combined interaction of actuator gear means 37, pivotal trunnion member or means 41 and pivotal trunnion member or means 43, which combine to comprise pivotal trunnion means. The gear means 37 interacts with respect to the frame support 11 and with respect to the pivotal trunnion members 41 and 43 (the assembly of parts being shown in the drawings generally) to cause the pivotal movement of the connected cam plates 36. The pivotal trunnion member 41 is generally cylindrically shaped and is pivotally mounted to the frame support member 14 through extending ear brackets 14C. The gear means 37 is threaded in a corresponding manner so as to be threadedly received through a threaded aperture 41A extending through the trunnion member 41. The gear member 37 is continued in a linearly elongated dimension to connect to the trunnion member 43, and movement of the gear member 37 along its length dimension is effective to provide the pivotal movement of the cam plates 36. The trunnion member 43 is pivotally mounted to and transversely of the corners 36C of the cam plates 36.

In accordance with the present invention, the actuator gear means 37 is comprised of an elongated circumferentially threaded worm gear member or element 39, threaded along a substantial portion of its axial length dimension except for a non-threaded distal or inner free end portion 39A, and having a hexagon shaped outer end portion 40 by which the gear member 39 may be engaged and driven along its length dimension, selectively in the direction of the central opening 15 and oppositely thereof, respectively. The cylindrical trunnion unit 41 receives in threaded engagement the gear element 39 through the threaded opening 41A, and with the trunnion unit 41 mounted to the frame brackets 14C, the threaded axial movement of the gear member 39 moves the gear member 39 through the aperture 41A and in the direction of the central opening 15 of the frame support 11, or selectively in the opposite direction. The trunnion member 41 is provided on its opposite end portions through provision of a pair of pin or shoulder elements 41B, cylindrically shaped and being inserted through suitable apertures in the free end portions of the spaced pair of frame brackets 14C, which pins 41B enable the trunnion unit 41 to be pivotally mounted for rotation with respect to the frame support member 14, best shown in FIGS. 3 and 3A with the combination of parts of the gear member 39 and trunnion units 41 and 43 shown more clearly in FIG. 3B (an exploded disassembled view of parts).

Figures 3, 3A:
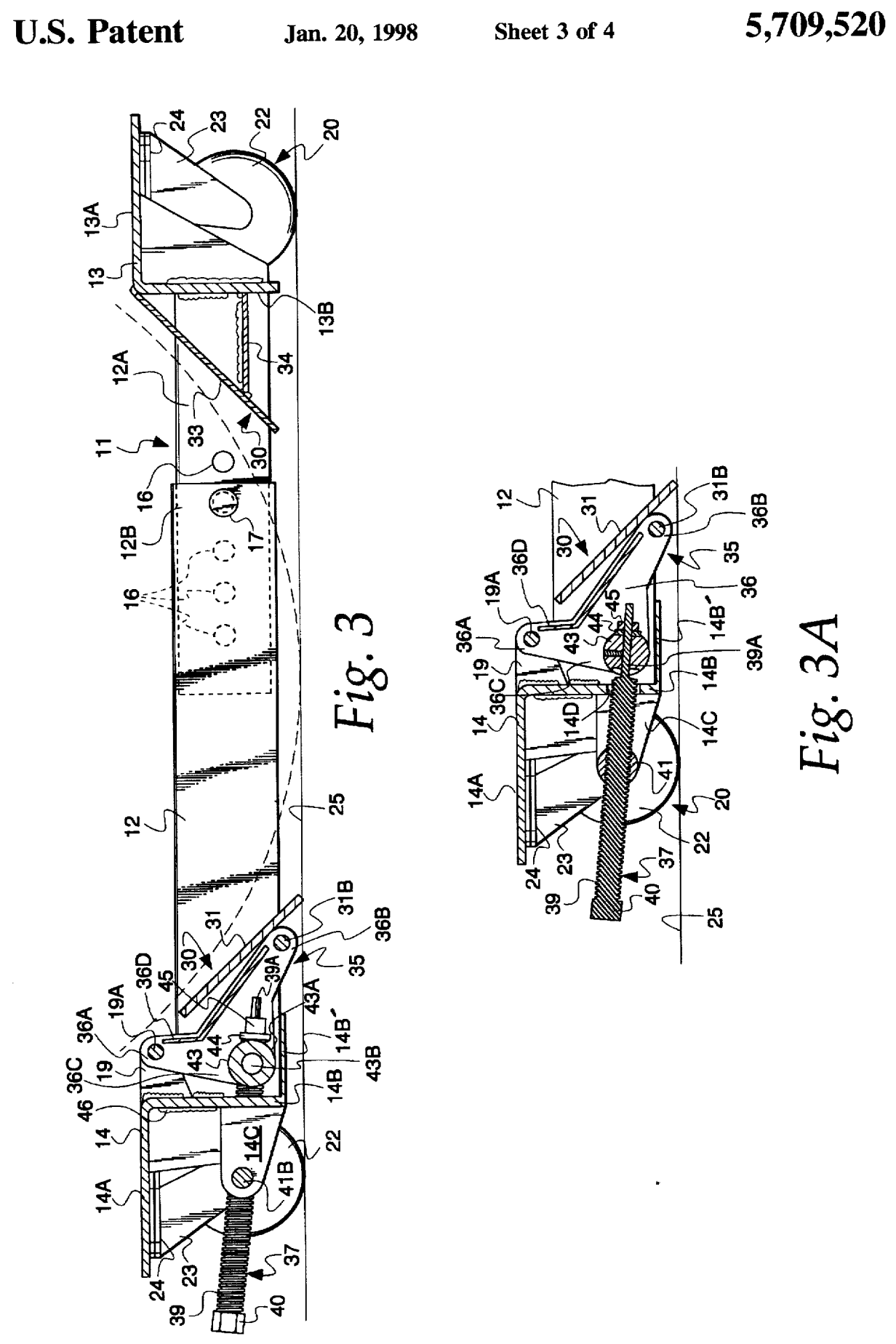

As shown in FIGS. 3, 3A and 3B, the trunnion member 41 is generally cylindrical, is of sufficient length to provide extension between the mounting brackets 14C, and is provided with the protruding pins 41A on each end thereof (one pin 41A shown in FIG. 3B and in cross section in FIG. 3) about which the trunnion cylinder 41 is pivotally connected to the frame support member 14. The worm gear member 39 can be caused to be rotated by the engagement of the hexagon configured end portion (bolt head) 40, although other equally suitable means of driving the gear member 39 could be provided as well, and such alternative means of providing threaded movement to the gear member 39 would not detract from the essence, scope and principal of the present invention as taught herein.

On the innermost distal free end portion of the gear member 39, the non-threaded end portion 39A is connected to the cam plates 36 by providing that the end portion 39A connect to the cylindrical trunnion member 43 comprising a part of the trunnion means formed by trunnion members 41 and 43. The end portion 39A is inserted through a central opening 43A in the trunnion unit 43. In turn the trunnion member 43 is connected to the frame brackets 14C, by providing a pair of protruding pin or shoulder members 43A extending from the ends of the member 43, and being pivotally received by suitable apertures (not shown or numbered in the drawings) in the central portion 36C of the bell-crank cam plates 36 (see FIGS. 2A and 2B). The trunnion unit 43 is similar in shape to the provision of the trunnion member 41, although not necessarily the same size or dimension. The central aperture 43A of the trunnion member 43 is not threaded, but is a slot-like aperture, and the non-threaded end portion 39A is passed through the aperture 43A and captured therein by engaging washer and nut devices shown by typical embodiments at 44 and 45, respectively. The pins 43B are used to pivotally connect the trunnion member 43 to the cam plates 36, and as the gear member 39 moves inwardly of the central opening 15 through the trunnion member 41, moving with respect to the fixed frame support 11, the end portion 39A of the gear member 39 moves the cam plates 36 while the gear member 39 is permitted to be pivotally moved with respect to the frame support brackets 14C and the cam plates 36.

The linear axial movement of the threaded gear member 39 with respect to the frame support member 14, as for example in the direction of providing movement of the lift plate 31 into the central opening 15, will cause the cam plates 36 to be moved inwardly at the engagement of the central portions 36A through means of the trunnion member 43. The pivotal movement of the cam plates 36 about the upper pivot axis formed by pin 19A will cause the gear member 39 to be lifted at its distal end portion 39A, and the pivotal connections of the trunnion member 43 with the cam plates 36 and the trunnion member 41 with the frame brackets 14C, will permit the continued threaded movement of the gear member 39 through the trunnion 41 without binding action occurring. The gear member 39 will be permitted to be pivoted with respect to both the frame support member 14 and the cam plates 36, in an important element and teaching of the present invention. Other suitable alternatives could readily be provided to the capturing washer 44 and nut 45 such as cotter pin to capture the extremity of the free end portion 39A of the gear member 39.

In describing the reverse movement of the gear member 39, that is, away from the insertion of the cam plates 36 and lift plate 31 into the central opening 15, the reversing movement of the gear member 39 will cause the cam plates 36 and lift plate 31 to follow to cause the lowering of the wheel assembly 21 onto the floor 25. Axial movements of the gear member 39 are made sufficiently accurate by the selecting desired thread size, and strength is largely a function of the circumferential sizes selected for the gear element 39 and trunnion members 41 and 43. Suitable grease fittings as shown at 41C and 43C in FIG. 4 of the drawings, may be provided for the trunnion members 41 and 43, respectively, for providing proper lubrication to the inserted gear member 39. The axial movement of the gear member 39 is desirably caused by directly applied torque force to the hexagon shaped end portion 40 thereof.

The nut configured end surface 40 on the outermost extremity of gear element 39 effects rotation of element 39 when engaged by either manual or automatic nut driving mechanism (not shown). The opposite end portion 39A of the gear element 39 has been inserted through the trunnion member 43, without threaded engagement as stated above, for the purpose of providing attachment to the pivotal trunnion member 43 and the interconnected cam plates 36. The gear member 39 is provided along the central portion thereof to pass through the wall member 14B of the frame support end portion 14 by provision of a suitable aperture 14D as shown only in FIG. 3A.

As heretofore stated, if desired to provide lifting of a captured wheel assembly 21 from both sides at once, the lift plate 31 could be duplicated and the fixed plate 33 deleted, and duplications of bell-crank cam mechanism 35 and gear means 37 and trunnion means 41 and 43 would be provided. However, the description of one such lift means 31 and cam means 37 and associated trunnion means 41 and 43, and their interconnections and interactions, is deemed sufficient for providing an enabling disclosure thereof. Further, although the preferred embodiment shows the lift plate 31 to be mounted on the left side of the frame support 11 as viewed in FIG. 1, the lift plate 31 could be equally suitably mounted to operate from the opposite right side of the frame support 11 as viewed in FIG. 1, and the particular orientation of the movable lift plate 31 to either frame support member 13 or 14 is not limiting to the scope of the present invention.

In a summary of the lifting action provided by the improved wheel dolly 10 in accordance with the principal teachings of the present invention, in order to effect a raising of the lift plate 31, the worm gear element 39 of the gear mechanism 37 is rotated in a manner to obtain an inward movement of the gear element 39 with respect to the trunnion member 41 and the frame support member 14, causing the connected inner end portion 39A, connected to the pivotal trunnion member 43 mounted on the central portion 36A of the cam plates 36, to move the pair of cam plates 36 inwardly and upwardly about their pivot axis 19A, thereby providing movement of the lift plate 31 attached at 31A to the forward end portion of the cam plates 36. The lift plate 31 will thus be caused to come into contact with the outer circumferential surface of the adjacent wheel assembly 21 and effect vertical lifting thereof through cooperation with the horizontal arresting action of the stationary and oppositely disposed lift plate 33 secured to the frame member 13. To effect a lowering of the wheel assembly 21, the worm gear element 39 is oppositely rotated to provide an outward movement with respect to the trunnion member 41 and the frame support member 14, and the connected cam plates 36 and lift plate 31 follow pivotally downwardly to move the lift plate 31 downwardly and inwardly of the frame support 11 and away from extension into the opening 15, to lower the wheel assembly 21 into contact with the floor 25, whereby the wheel dolly 10 may be removed from the wheel assembly if desired to do so.

It is apparent from a description of the utility of the improved wheel dolly 10 of the present invention, that in application to lift the two stationary non-tripod rotatable wheel assemblies of a light aircraft, or when applied to all stationary non-rotatable wheel assemblies of an aircraft, each of such wheel assemblies could be lifted and supported by a wheel dolly 10 of the present invention, providing the aircraft to be fully maneuverable within the tight or restricted confines of a hanger or storage area. Although the wheel dolly 10 of the present invention is not restricted in its application and use to light aircraft, the wheel dolly 10 was configured and designed with this application in mind.

An added optional feature that would enhance the present invention that is not shown in the drawing pertains to providing guard rail means that would act to restrain or prevent the wheel assembly 21 from slipping out of the central opening 15 of the frame support 11. If it becomes desirable to provide that the inserted wheel assembly 21, that is, the wheel assembly 21 being disposed in the central opening 15 of the frame support 11, is captured against side or lateral movement to the extent to come out of the central opening 15 and perhaps fall off the lift plate 31, there can be provided guard rail means in the form of an elongated rod or rail member extending between the opposite end frame members 13 and 14 at their outermost extremities, which can be connected (but in a removable manner) to the members 13 and 14 so as not to be readily movable from its connection. Such a rod member, although not shown in the drawing, is believed to be sufficient to accomplish the restraint of any adjacently positioned wheel assembly 21, and is not mandatory and does not constitute an essential feature of the present invention. The configuration of such a rod member could be cylindrical or frame shaped similarly to the frame support members 13 and 14, and the selection of the dimensions of the rod member and the provisions of connection to the frame support members 13 and 14 is a matter well within the skill of the practitioner of the pertinent art. Other equally and alternative means of providing restraint to the wheel assembly 21, such as to provide pivotal struts (not shown in the drawing) that would pivot into interfering extension across the central opening adjacent to the tire assembly 21, while mounted in a suitable manner to the wheel dolly 10 can no doubt be used and are intended to be included in the scope of the present invention.

The exemplary embodiment of this invention has been described in its preferred embodiment. It is to be understood that the preferred embodiment is merely one such embodiment that could incorporate the principals and teachings of the present invention, and that no doubt a skilled person having ordinary skill in the art could devise other equally suitable and equivalent embodiments to utilize and incorporate the principals and teachings of the present invention. It is not intended herein to limit the scope, intent and content of the invention to the specific arrangements, constructions or structures described or shown, for various other modifications thereof may become apparent or preferred by other persons having ordinary skill in the art.

What is claimed is:

1. An improved wheel-lift apparatus comprising wheel dolly or caddy means useful to provide mobility, lift and support for aircraft wheel assemblies for facilitating aircraft maneuverability in hanger or storage areas, comprised of generally U-shaped frame support means having a cross member and a pair of parallel spaced extended end frame members defining an opening therebetween within which to laterally receive an aircraft wheel assembly, a pair of lift plate means oppositely-disposed and supported by the extended frame members, respectively, at least one of the lift plate means being pivotably movable to engage the wheel assembly to provide lift thereof, pivotal cam means connected to the movable lift plate means and providing upward and downward pivotal movement thereto, threaded rotatable gear means having an elongated length dimension and engaging the pivotal cam means on a distal free end thereof, said gear means being movable along its length dimension to provide pivotal movement of the cam means, and pivotal trunnion means being pivotally supported by the frame support means and having threaded aperture means through which to receive correspondingly threaded gear means for providing pivotal movement of the gear means during rotational movement along the length dimension thereof for enabling the gear means to follow the pivotal movement of the cam means, and the pivotal trunnion means is comprised of a pair of pivotal mounted trunnion members, a first trunnion member being pivotally connected to the selected frame support member and receiving the gear means therethrough for providing pivotal movement to the gear means with respect to the selected frame support member, and a second trunnion member being pivotally connected to the cam means for providing pivotal movement to the gear means with respect to the cam means.

2. An adjustable wheel-lift apparatus as claimed in claim 1 wherein the first trunnion member is pivotally connected to the selected frame support member and has an aperture extending therethrough, said first trunnion member being connected to the gear means for providing pivotal movement of the gear means with respect to the selected frame support member, and the second trunnion member is pivotally connected to the cam means for providing pivotal movement of the gear means with respect to the cam means, and the gear means is comprised of an elongated length dimensional threaded worm gear member, and the aperture of the first trunnion member is correspondingly threaded for providing threaded rotational movement of the gear member to pass through the first trunnion member with selected rotational movement of the gear member.

3. An improved wheel dolly apparatus for jacking and moving wheel assemblies, including in combination:

generally U-shaped frame support means having a center bight support member and a pair of oppositely disposed parallel spaced end frame support members defining therebetween a central opening into which a wheel assembly is receivable to extend laterally across said opening;

lift plate means mounted on the end frame support members and comprised of a pair of lift plate members oppositely disposed across the opening of the frame support means, at least one of said lift plate members being pivotably mounted and selectively movable to move interiorly into the central opening of the frame support means to engage the wheel assembly disposed in the central opening, and being selectively movable to move exteriorly from the opening to disengage the wheel assembly;

generally triangularly shaped pivotally mounted cam means including one triangular corner portion thereof which is pivotally mounted with respect to a selected frame support member, another triangular corner portion of which is pivotally connected to the movable lift plate member, and having a third corner portion thereof disposed generally intermediately between the other two corner portions, generally elongated threaded gear means pivotally mounted for support by a selected one of the end frame support members and being movable along its length dimension through selective rotation thereof with respect to the end frame support member, said gear means being pivotally connected to the third corner portion of the cam means and providing pivotal movement of the cam means with rotational movement of the gear means, and trunnion means providing pivotal connection between the gear means and the selected end frame support member, and pivotal connection of the gear means with the cam means, the cam means providing pivotal movement to the connected lift plate member proportional to the lengthwise rotational movement of the connected threaded gear means for driving the lift plate means selectively into and out of engagement with the wheel assembly to provide lifting of and lowering of, respectively, the wheel assembly.

4. An improved wheel dolly apparatus as claimed in claim 3 wherein the cam means is comprised of a pair of parallel spaced bell-crank type configured cam plates interconnected to act as a single moving cam means, and the pair of cam plates are generally elongated and oriented to define an upper region, central region and a lower region thereof, and are connected through a first pivot axis at the upper region thereof to the selected frame support member and through a second pivot axis at the lower region thereof to the movable lift plate means, and through a third pivot axis disposed generally intermediately of the first and second pivot axes, in the central region thereof, to a free distal end portion of the gear means.

5. An improved wheel dolly appartus as claimed in claim 3 wherein the trunnion means is comprised of a pair of pivotal trunnion members, a first trunnion member pivotally connected to the frame support member that supports the gear means, threadedly receiving the gear means therethrough and providing pivotal movement of the gear means with respect to the frame support member, and a second trunnion member pivotally connected to the cam means and connected to the gear means at a free distal end portion thereof and providing pivotal movement of the gear means with respect to the cam means with rotational lengthwise movement of the gear means.

6. An improved wheel dolly apparatus as claimed in claim 3 wherein the trunnion means is comprised of a pair of pivotal trunnion members, a first trunnion member pivotally connected to the frame support member that supports the gear means, threadedly receiving the gear means therethrough and providing pivotal movement of the gear means with respect to the frame support member, and a second trunnion member pivotally connected to the cam means and connected to the gear means at a free distal end portion thereof and providing pivotal movement of the gear means with respect to the cam means with rotational lengthwise movement of the gear means, and the gear means is comprised of an elongated length dimension threaded worm gear member, and the first trunnion member includes a threaded aperture extending therethrough for receiving the threaded worm gear member for providing threaded movement of the gear member through the first trunnion member with selected rotational movement of the worm gear member.

7. An improved wheel dolly apparatus as claimed in claim 3 wherein the bight member of the frame support means is adjustable along its length dimension to selectively adjust the spacing of the end frame support members thereof, for providing lateral adjustment across the central opening defined between the spaced apart end frame support members.

8. An improved wheel-lift apparatus comprising wheel dolly or caddy means useful to provide lift and support for light weight wheel assemblies, comprised in combination of a frame support means having a cross member and a pair of parallel spaced extended end frame members defining an opening therebetween within which to receive a selected wheel assembly, movable cam means pivotally mounted to a selected end frame member, movable lift plate means pivotally mounted to the movable cam means and being selectively moved thereby to move interiorly of the opening of the frame support means to engage the wheel assembly to provide lift thereof, elongated length dimensional movable gear means connected to the pivotal cam means on a distal free end thereof, and being movable along its length dimension to provide pivotal movement of the cam means, and pivotal trunnion means being pivotally supported by the frame support means and connected to the gear means for providing pivotal movement of the gear means during length dimensional movement of the gear means for enabling the gear means to follow the pivotal movement of the cam means, the cam means being comprised of a pair of parallel spaced bell-crank type configured cam plates interconnected to act as a single moving cam means, and the pair of cam plates are generally elongated and oriented to define an upper region, central region and a lower region thereof, and are connected through a first pivot axis at the upper region thereof to the selected end frame member and through a second pivot axis at the lower region thereof to the movable lift plate means, and through a third pivot axis disposed generally intermediately of the first and second pivot axes, in the central region thereof, to a free distal end portion of the gear means.

9. An improved wheel-lift apparatus as claimed in claim 8 wherein the pivotal trunnion means is comprised of a pair of pivotal mounted trunnion members, a first trunnion member being pivotally connected to a selected end frame member of the frame support means and having a threaded aperture extending therethrough through which the gear means is received for providing rotational movement of the gear means through the first trunnion member, and for providing pivotal movement to the gear means with respect to the selected end frame member, and a second trunnion member being pivotally connected to the cam means for providing pivotal movement to the gear means with respect to the cam means.

10. An improved wheel-lift apparatus as claimed in claim 8 wherein the pivotal trunnion means is comprised of a pair of pivotal mounted trunnion members, a first trunnion member being pivotally connected to a selected end frame member of the frame support means and having a threaded aperture extending therethrough through which the gear means is received for providing rotational movement of the gear means through the first trunnion member, and for providing pivotal movement to the gear means with respect to the selected end frame member, and a second trunnion member being pivotally connected to the cam means at the location of and comprising the third pivot axis of the cam means for providing pivotal movement to the gear means with respect to the cam means.

11. An improved wheel-lift apparatus as claimed in claim 8 wherein the pivotal trunnion means is comprised of a pair of pivotal mounted trunnion members, a first trunnion member being pivotally connected to a selected end frame member of the frame support means and having a threaded aperture extending therethrough through which the gear means is received for providing rotational movement of the gear means through the first trunnion member, and for providing pivotal movement to the gear means with respect to the selected end frame member, and a second trunnion member being pivotally connected to the cam means at the location of and comprising the third pivot axis of the cam means for providing pivotal movement to the gear means with respect to the cam means, and the lift plate means is comprised of a pair of lift plate members disposed on opposite ends of the central opening defined to extend between the pair of parallel spaced extended end frame members, at least one of the lift plate members being connected to the cam means at the location of the second pivot axis thereof for movement therewith, and the other lift plate member being fixedly connected to an oppositely disposed end frame member, the movable lift plate member moving with the cam means when the cam means is moved by the connected gear means.

* * * * *